B. CRANNER.
APPARATUS FOR TRANSMITTING OPTICAL SIGNALS.
APPLICATION FILED OCT. 30, 1916.
1,256,441. Patented Feb. 12, 1918.
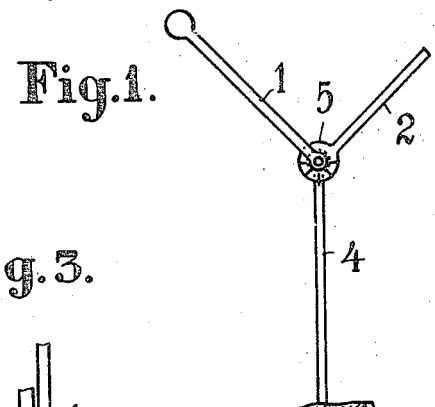
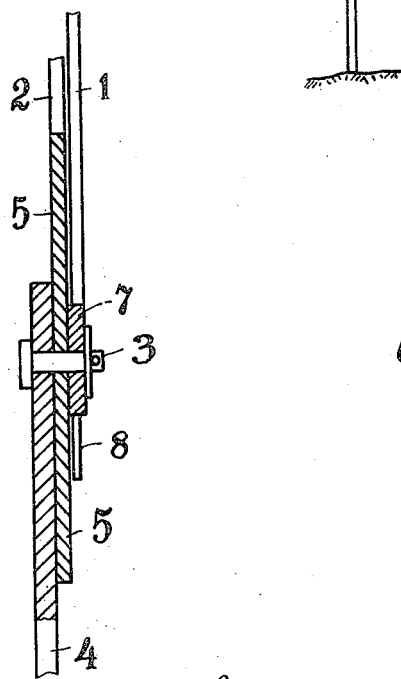
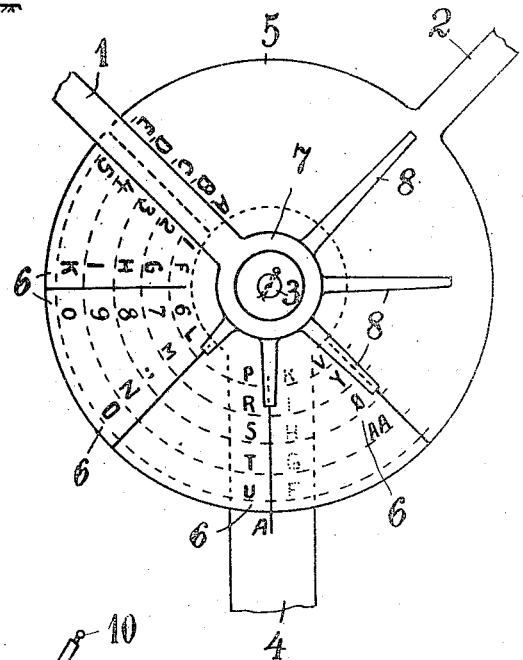
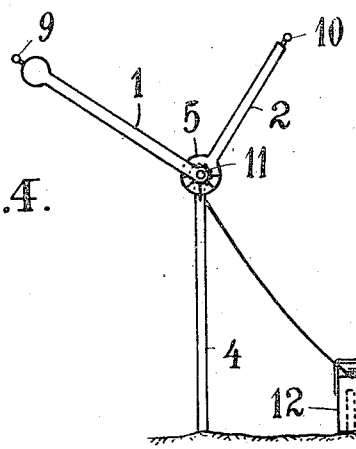
Inventor.
Bjarne Cranner,
By [signature] atty.

UNITED STATES PATENT OFFICE.

BJARNE CRANNER, OF KONGSBERG, NORWAY.

APPARATUS FOR TRANSMITTING OPTICAL SIGNALS.

1,256,441.  Specification of Letters Patent.  Patented Feb. 12, 1918.

Application filed October 30, 1916. Serial No. 128,592.

*To all whom it may concern:*

Be it known that I, BJARNE CRANNER, a subject of the King of Norway, residing at Kongsberg, Norway, have invented certain new and useful Improvements in Apparatus for Transmitting Optical Signals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the transmitting of optical signals for various purposes and has for its object a simple mechanical device for sending and deciphering optical signal messages so as to enable such messages to be transferred and received safely even by operators without any or with very little experience.

In the following description I shall explain the principle of my invention and the constructional embodiment of same, reference being had to the accompanying drawings where:

Figure 1 is a diagrammatic view of an apparatus embodying my invention.

Fig. 2 is a view on a larger scale of the vital parts of the apparatus shown on Fig. 1.

Fig. 3 is a sectional view.

Fig. 4 is a diagrammatic view of the apparatus fitted out for night signaling.

Hitherto the operator on signaling has usually held one flag or stick in each hand and to send or to read a signal it has been necessary to know by heart the different positions of the arms corresponding to the several signals.

Now according to my invention for transmitting and receiving signals I make use of two arms 1 and 2 (see Fig. 1) of different length and pivoted at one end to the top of a stick or standard 4 which can be planted in the ground. Each arm I combines by suitable means with an indicator in such a way, that on putting the arms into their different positions relatively to the stick 4 their indicators will mark on a table the columns for one arm and the individual signal in said columns for the other arm, so that the signal indicated by the position of the arms can be read off on the table.

To transmit a signal the sender places the arms of his apparatus so that the indicators point out the particular signal to be transmitted. The receiver then places the arms of his apparatus in a similar position and reads the signal pointed out by the indicators. It should be noted however, that sender and receiver will in most cases see the signaling device from opposite sides. To read the signals the apparatus may simply be turned around or one might use a small model of the device formed as an image of the same, or the device might be supplied with an extra table of signals for receiving purposes.

The signaling arms 1 and 2 are pivoted at one end on the bolt 3 at the top of a stick 4. On the arm 2 is fixed a round disk 5 rotatable on the bolt 3.

This disk 5 carries the table of signals, the rows being arranged on concentric circles and in radially arranged columns 6. The arm 1 has fixed to it a hub 7, which is likewise turned about the pin 3 and carries a number of pointers or hands 8 of varying length, the angular distance between said hands being chosen so as to correspond to the angular distance between the radial signal columns on the disk 5.

When a signal is to be transmitted the arm 2 carrying the signal table disk 5 is first turned until the radial column, in which the particular signal to be transmitted is to be found points toward the mark A on the stick 4.

Then the arm 1 is turned until that of the hands 8 on its hub 7, which in length corresponds to the individual signal to be transmitted in this radial signal column points on this individual signal.

Thus on Fig. 2 the arms are placed so at to signal the letter R.

For night signaling electric lamps 9, 10 and 11 (Fig. 4) may be placed on the ends of the arms 1 and 2 and on the outside of the center of the hub, respectively. The lamps are removably mounted and may preferably get their current from a portable dry cell 12. From the same dry cell a cable may lead to a lamp adapted to be fastened to the breast of the signaler, and serving to throw light on the signaling disk.

It will be evident that my invention is not limited to the apparatus above described. In fact though I have found the said form of apparatus to be a most suitable embodiment of my invention, when applied to military purposes it may equally well be possible to use any other shape of signal tables and indicators for same provided only that the said indicators are connected (directly or indirectly) to the signaling arms in the manner described.

In order to facilitate the reading of the signal by the receiving signaler I may for instance place the signals to be read on the opposite side of the radial lines on the signaling disk (see letters in dotted lines in Fig. 2).

Besides its use for the purposes indicated above my signaling device is also adapted for transferring messages from or to ships, instead of by the signal flags now in common use.

The signals or messages corresponding to the several positions of the signaling arms might then be sent in one language and received in another.

By signaling from ships or from stationary signaling places ashore the signaling arms may be connected by means of a suitable transmission to a driving device, said driving device being suitably placed near the signaling arms together with the table of signals and the indicators.

I claim:

1. A signaling device comprising two signaling arms of different length the relative position of which indicates the signal to be transferred, a table of signals in the form of a circular rotatable disk and having on one or both sides signals arranged upon concentric circles and simultaneously in columns along radial lines said disk being connected with one signaling arm in such a way as to indicate by its angular position the column of signals corresponding to the position of said signaling arm, another indicator being arranged to point out the individual signals in the column corresponding to the position of said second signaling arm.

2. A signaling device comprising two signaling arms of different length the relative position of which indicates the signal to be transferred, a table of signals in the form of a circular rotatable disk and having on one or both sides signals arranged upon concentric circles and simultaneously along radial lines, said disk being connected with one signaling arm in such a way as to indicate by its angular position the column of signals, corresponding to the position of said signaling arm, a rotatable hub being arranged coaxially with the table disk and connected to the second signaling arm, said hub carrying pointers of varying length to indicate the individual signals relatively to the columns of signals on one or both sides of the table disk.

3. A signaling device comprising two signaling arms of different length the relative position of which indicates the signal to be transferred, a table of signals in the form of a circular rotatable disk and having on one or both sides signals arranged upon concentric circles and simultaneously along radial lines, said disk being connected with one signaling arm in such a way as to indicate by its angular position the column of signals, corresponding to the position of said signaling arm, a rotatable hub being arranged coaxially with the table disk and connected to the second signaling arm, said hub carrying pointers of varying length to indicate the individual signals relatively to the columns of signals on one or both sides of the table disk, a lamp for night signaling fastened to the end of each signaling arm, and a lamp fastened so as to indicate the center of the hub.

In testimony that I claim the foregoing as my invention, I have signed my name in presence of two subscribing witnesses.

BJARNE CRANNER.

Witnesses:
C. NORMAN,
C. L. HANSEN.

Copies of this patent may be obtained for five cents each, by addressing the "Commissioner of Patents, Washington, D. C."